United States Patent
Winters et al.

(10) Patent No.: US 10,504,152 B2
(45) Date of Patent: Dec. 10, 2019

(54) PLATFORM FOR DISTRIBUTING DEALS VIA A SOCIAL NETWORKING SYSTEM

(75) Inventors: Kelly Winters, San Francisco, CA (US); Bo Hu, San Jose, CA (US); Emily Clark White, Palo Alto, CA (US); Koun Han, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 272 days.

(21) Appl. No.: 13/181,347

(22) Filed: Jul. 12, 2011

(65) Prior Publication Data
US 2012/0239467 A1     Sep. 20, 2012

Related U.S. Application Data

(60) Provisional application No. 61/452,577, filed on Mar. 14, 2011.

(51) Int. Cl.
G06Q 30/00 (2012.01)
G06Q 30/02 (2012.01)
G06Q 50/00 (2012.01)

(52) U.S. Cl.
CPC ..... *G06Q 30/0269* (2013.01); *G06Q 30/0207* (2013.01); *G06Q 30/0241* (2013.01); *G06Q 50/01* (2013.01)

(58) Field of Classification Search
CPC .................................................... G06Q 30/02
USPC ......................................................... 705/14
See application file for complete search history.

(56) References Cited

U.S. PATENT DOCUMENTS

| 6,269,343 B1 | 7/2001 | Pallakoff |
| 8,010,460 B2 | 8/2011 | Work et al. |
| 8,140,402 B1 | 3/2012 | Mesaros |
| 2006/0085259 A1 | 4/2006 | Nicholas et al. |
| 2006/0212355 A1 | 9/2006 | Teague et al. |
| 2008/0082420 A1 | 4/2008 | Kargman et al. |

(Continued)

FOREIGN PATENT DOCUMENTS

| CN | 1316714 A | 10/2001 |
| CN | 101470886 A | 7/2009 |

(Continued)

OTHER PUBLICATIONS

PCT International Search Report and Written Opinion for International Patent Application No. PCT/US2012/028349, dated May 29, 2012, 12 pages.

(Continued)

*Primary Examiner* — Arthur Duran
(74) *Attorney, Agent, or Firm* — Fenwick & West LLP

(57) ABSTRACT

A social networking system acts as a platform for distributing deals from one or more deal providers. The users of the social networking system can interact with information describing the deals via a dashboard user interface provided by the social networking system. When users purchase deals on the social networking system's platform, the social networking system receives a portion of the deal price called the platform share and compensates the users for purchasing deals via the social networking system. The compensation may be funded from the revenue received by the social networking system for the purchases (the platform share). The compensation provided to a user may depend on social information associated with the user, such as the number of the user's connections also participating in the deal.

21 Claims, 7 Drawing Sheets

(56) References Cited

U.S. PATENT DOCUMENTS

| | | | |
|---|---|---|---|
| 2008/0133336 A1 | 6/2008 | Altman et al. | |
| 2008/0140476 A1 | 6/2008 | Anand et al. | |
| 2008/0189169 A1* | 8/2008 | Turpin et al. | 705/10 |
| 2008/0281622 A1 | 11/2008 | Hoal | |
| 2008/0294994 A1 | 11/2008 | Kruger et al. | |
| 2008/0306826 A1* | 12/2008 | Kramer et al. | 705/14 |
| 2009/0119167 A1 | 5/2009 | Kendall et al. | |
| 2009/0157439 A1 | 6/2009 | Fuchs | |
| 2009/0222348 A1 | 9/2009 | Ransom et al. | |
| 2009/0319359 A1 | 12/2009 | Soza et al. | |
| 2010/0030578 A1 | 2/2010 | Siddique et al. | |
| 2010/0121696 A1 | 5/2010 | Green et al. | |
| 2010/0228617 A1 | 9/2010 | Ransom et al. | |
| 2010/0257028 A1 | 10/2010 | Hillerbrand | |
| 2010/0332304 A1 | 12/2010 | Higgins et al. | |
| 2011/0029364 A1 | 2/2011 | Roeding et al. | |
| 2011/0161130 A1 | 6/2011 | Whalin et al. | |
| 2012/0029992 A1 | 2/2012 | De Facendis | |
| 2012/0072271 A1* | 3/2012 | Dessert et al. | 705/14.1 |
| 2012/0130784 A1* | 5/2012 | Neuhauser et al. | 705/14.16 |
| 2012/0166267 A1* | 6/2012 | Beatty | G06Q 30/0247 705/14.21 |
| 2012/0209722 A1 | 8/2012 | Plut | |
| 2012/0221387 A1* | 8/2012 | Liu et al. | 705/14.16 |
| 2012/0290433 A1 | 11/2012 | England et al. | |
| 2013/0060623 A1 | 3/2013 | Walker et al. | |
| 2013/0060637 A1 | 3/2013 | Walker et al. | |

FOREIGN PATENT DOCUMENTS

| | | |
|---|---|---|
| CN | 101661592 A | 3/2010 |
| CN | 101836226 A | 9/2010 |
| CN | 101960479 A | 1/2011 |
| JP | 2004-054381 A | 2/2004 |
| JP | 2006-013971 A | 1/2006 |
| JP | 2008-243008 A | 10/2008 |
| JP | 2011-503701 A | 1/2011 |
| KR | 10-0749093 B1 | 8/2007 |
| WO | WO 2008094660 A1 | 8/2008 |

OTHER PUBLICATIONS

U.S. Appl. No. 13/018,716, filed Feb. 1, 2011.
U.S. Appl. No. 13/019,061, filed Feb. 1, 2011.
Mexican Institute of Industrial Property, Office Action, Mexican Patent Application No. MX/a/2013/010433, dated Mar. 12, 2015, eight pages.
Chinese First Office Action, Chinese Application No. 2012800133248, dated Nov. 3, 2015, 19 pages.
Japanese Office Action, Japanese Application No. 2013-558067, dated Feb. 2, 2016, 5 pages.
Korean Office Action, Korean Application No. 10-2013-7026716, dated Nov. 30, 2017, 12 pages.
Indian Office Action, Indian Application No. 6383/CHENP/2013, dated Mar. 29, 2019, 6 pages.
United States Decision on Appeal, U.S. Appl. No. 13/289,973, filed Nov. 16, 2017, 8 pages.
United States Decision on Appeal, U.S. Appl. No. 13/181,344, filed Nov. 21, 2018, 15 pages.
United States Decision on Appeal, U.S. Appl. No. 13/181,307, filed Jul. 5, 2019, 18 pages.

* cited by examiner

FIG. 3

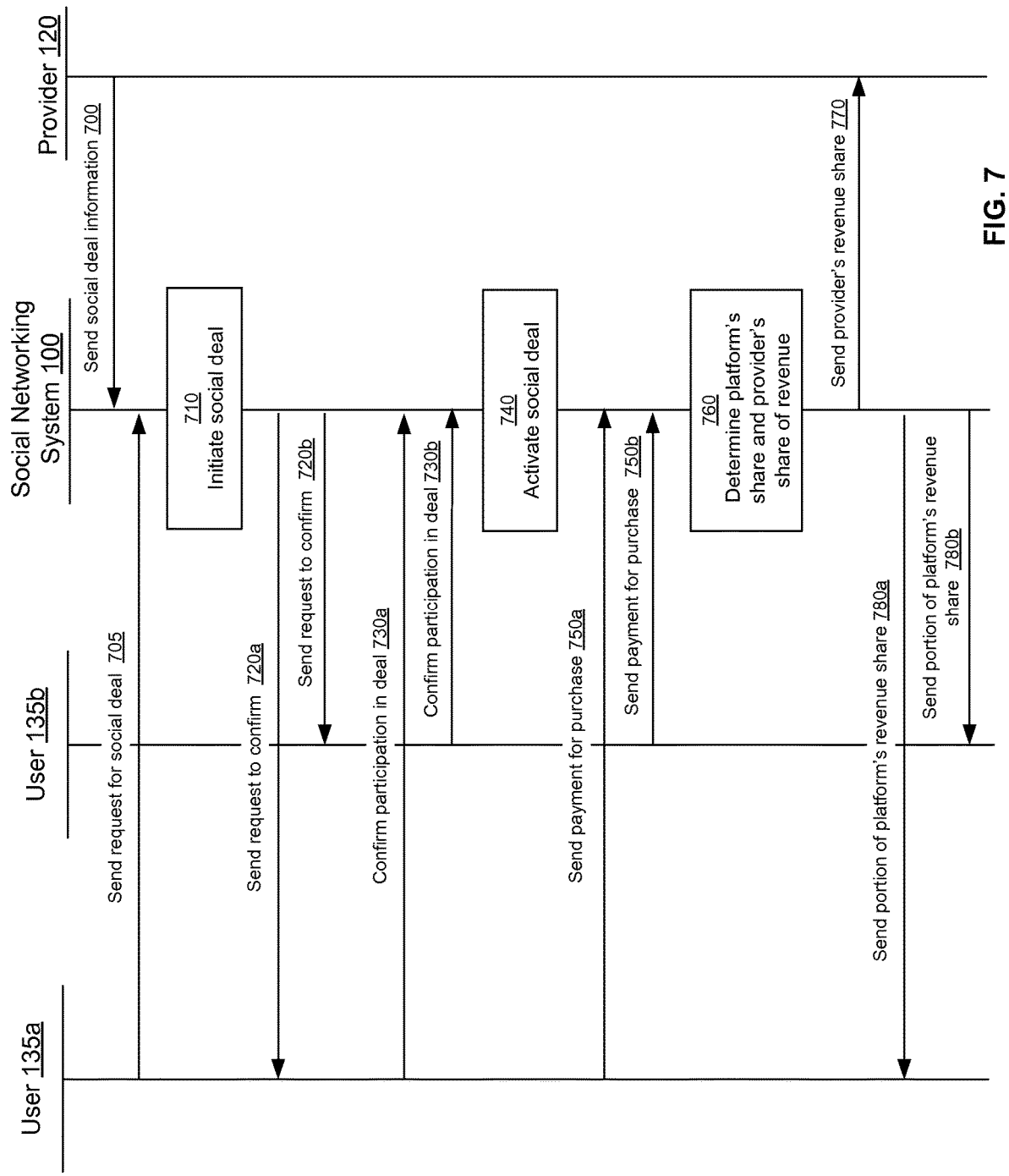

PLATFORM FOR DISTRIBUTING DEALS VIA A SOCIAL NETWORKING SYSTEM

CROSS REFERENCES TO RELATED APPLICATIONS

This application claims the benefit of U.S. Provisional Patent Application No. 61/452,577 filed Mar. 14, 2011, which is incorporated by reference in its entirety.

BACKGROUND

This invention relates to deals in social networking systems and in particular to distributing deals via a social networking system from one or more deals providers.

Providers of services and/or products offer deals to potential or current customers to entice them to make purchases. A deal is an offer to sell a product or service to a customer, oftentimes including a particular benefit available to customers who buy the product or service through the deal. For example, a deal may offer a product or service at a discounted price, such as a fixed percent of the original price or a fixed amount below the original price. A deal may offer a discount on a future purchase of a product/service upon a purchase of a similar or a different product/service. A deal may also offer access to inventory not open to the general population. For example, a deal may provide discount on a second product upon purchase of a first product. Deals are often offered by providers who are different from the actual seller of the product or service. The deal provider manages the deal purchase transaction and gives a voucher for the transaction to the customer, who can then redeem the voucher for the purchased product or service.

Providers offer deals for various reasons. Sometimes providers offer deals on products that they are trying to dispose of quickly to make room for a new line of products. Sometimes providers offer deals since they realize that users are interested in making a purchase only if there is a deal available. Users often closely monitor deals. Therefore deals draw attention of users to particular products and bring the product in their radar.

Providers are always coming up with creative ways to offer deals to get user's attention. However, if a user is not interested in a deal for a product or service, the efforts of the provider in directing these deals to the user get wasted. Therefore, providers prefer to direct their deals to users who are most likely to be interested in the deals offered in order to maximize sales of their products/services. Providers have not leveraged the power of social networking to make deals more effective to achieve their goals.

SUMMARY

The social networking system acts as a platform for providing deals to its users. The users participating in a deal provide revenue to the social networking system by making payments. The social networking system provides a portion of the revenue to the provider and retains a platform share of the revenue. The social networking system uses a portion of the platform share to compensate the participating users for purchasing deals via the social networking system. The compensation received by a participating user may depend on the participating user's connections in the social networking system.

In an embodiment, the portion of the platform share provided to a participating user depends on the connections of the participating user that are also participating users in the deal. For example, the portion of the platform share provided to a participating user may depend on the number of connections of the user participating in the deal. The social networking system may determine the portion of the platform share provided to a participating user based on the total number of connections of the user. The social networking system may determine the portion of the platform share provided to a participating user based on the rate at which the user and the connections of the user perform actions in the social networking system. These actions include uploading information in the social networking system, performing status updates, retrieving information from the social networking system, or communicating with users of the social networking system.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 3 is a user interface for allowing a user of a social networking system to interact with deals of interest to the user, in accordance with an embodiment of the invention.

FIG. 7 is an interaction diagram of a process illustrating how the social networking system acts as a platform for distributing deals, in accordance with one embodiment of the invention.

Figure 1:
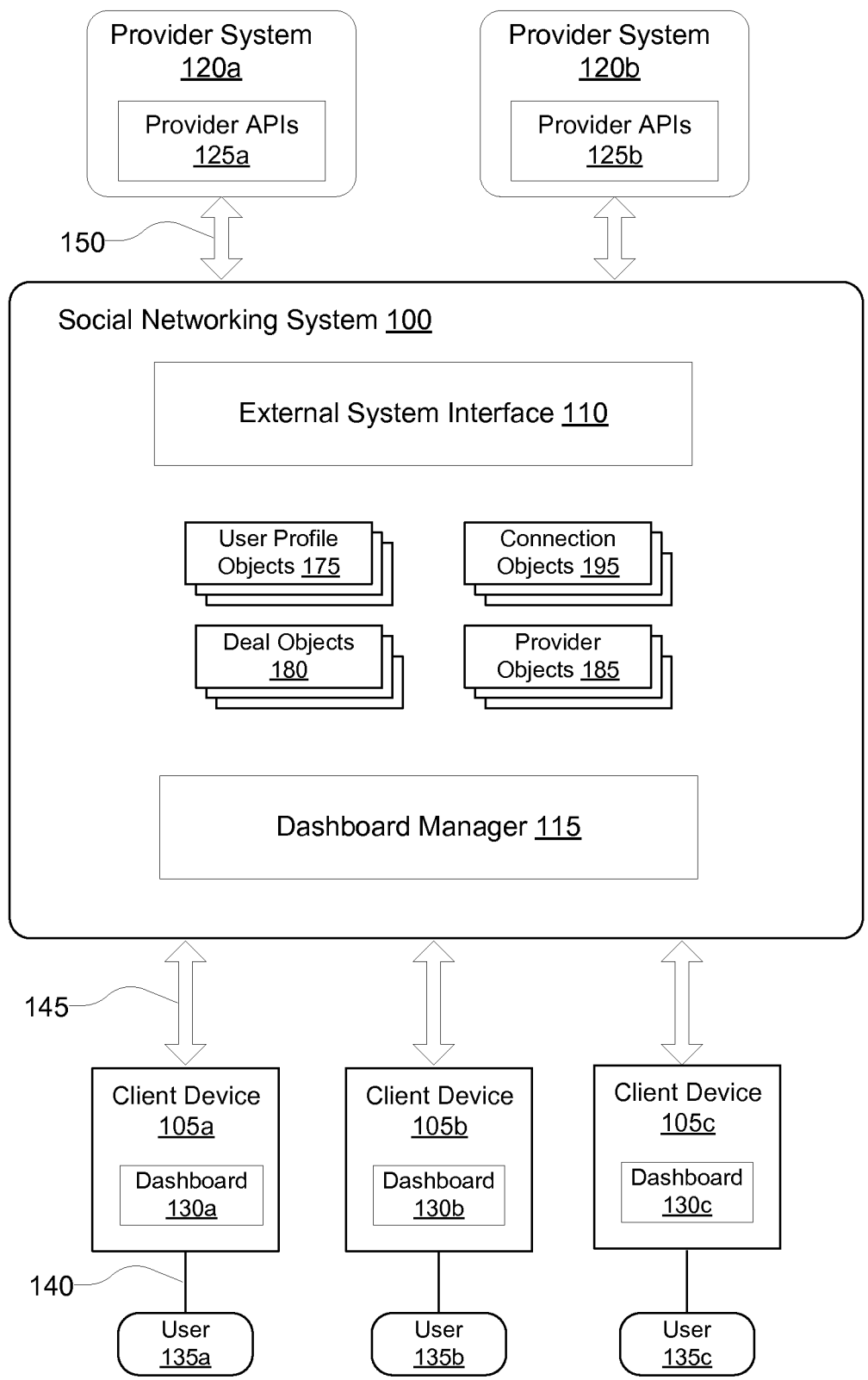
FIG. 1 is a diagram of a system environment for allowing users of a social networking system to interact with deals from providers, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments use social networking systems to incorporate social information of users to improve user interactions with deals. Incorporation of social information provides better experience for the users interacting with the deals which in turn results in more users getting interested in deals. This furthers the goals of the providers since the providers are attempting to increase the number of potential customers by offering deals. Besides, deals provide a social experience to the users and a valuable interaction with the social networking system. Users that find the social networking system valuable are more likely to be loyal to the social networking system. Increased loyalty of the users to the social networking system is likely to attract more providers offering advertisements and deals via the social networking system. Since social networking systems derive revenue from advertisements, this provides increased revenues for the social networking systems.

The social networking system acts as a platform for distributing deals. Users typically have the option of purchasing a deal via the provider directly or via the social networking system. Embodiments reward users of the social networking system for interacting with deals via the social networking system. A user that purchases a deal via the social networking system is provided with a platform share of revenue that the social networking system derives from the transaction associated with the deal. Accordingly, the user gets rewarded for interacting with the deal via the social networking system. The amount of the reward that the user gets depends on social information associated with the user, for example, the number of connections of the user and the rate of interactions of the user with the social networking system in general and with the user's connections in particular. Alternatively, the reward provided to a user can depend on social information associated with the user that is also associated with the deal, for example, number of connections of the user participating in the deal.

Information Describing a Deal

A deal is associated with an offer made to a user that provides certain benefits to the user upon acceptance. The benefit offered by a deal corresponds to a value of the deal or a price of the deal. For example, a deal that offers higher benefits provides higher value compared to a deal that offers lower benefits. In an embodiment, a user can purchase a deal by paying a price for the deal. The user can subsequently redeem the deal by making a purchase or a transaction. Providers often present a deal to the users along with their advertisements. Typically, the benefits offered by a deal are associated with a transaction, for example, a purchase of a product or service offered by the provider. A transaction between a customer and a provider involves an exchange between a user and a provider, wherein the customer provides money to the provider and the provider provides one or more products and/or services to the customer.

Benefits offered by a deal can include a reduction in the price of the product and/or service. For example, the deal may offer reduction in price by a fixed percent (e.g., 10% reduction in price) or a reduction in price by a fixed amount (e.g., price reduced by ten dollars). Alternatively, the benefits provided by a deal may include other financial advantages, for example, free shipping, a coupon for a subsequent purchase, a reduction in price of a different item bought in the same transaction, no sales tax, and the like. The benefits associated with a deal are referred to as the value of the deal or the price of the deal. A deal may have multiple participants and the benefit provided to each participant may depend on the social information associated with the participant.

A deal may be associated with a time period. For example, a deal can only be used after a start date and before an end date. The deal may be associated with other limits on the purchases. For example, the deal may apply to all items purchased in a transaction, the deal may apply to all purchases made on a particular day, or the deal may apply to a single item. These limits on the purchases applicable to a deal are called the maximum redemption of the deal.

A deal may be associated with an event. A deal may be applicable to in-store purchases as opposed to online purchases, or the deal may be for online purchases only. The deal may also have a specific redemption method. For example, the deal may require a user to present a coupon or a coupon code, the deal may be automatically offered upon making a purchase, the deal may require use of a particular type of payment mechanism including a specific type or credit or debit card, or the deal may require presentation of proof of membership in a club.

A deal may be associated with other conditions, for example, the deal may be offered to the user only if the number of purchases made by the user exceeds a threshold value or the total value of the purchases exceeds an amount. When the required conditions associated with a deal are satisfied, the deal is considered activated. The activation of a deal may require an explicit status change by the provider of the deal. Alternatively, the activation may be automatic upon satisfaction of the required conditions and the user gets the benefits of the deal when the user completes an applicable transaction. The user may be required to complete a transaction associated with the purchase to redeem an activated deal.

Activating a deal comprises marking the deal as ready for use by a user. For example, a deal that is activated can be presented to the user as a coupon that can be redeemed by the user. An activation of a deal may require certain actions to be performed by multiple users. For example, the activation of a deal may require multiple users to be present at a location associated with the provider. If more than a threshold number of user's friends' check-in to a location along with the user, the deal is activated. Each user who participates in the activation of the deal is called a participant of the deal. The deal may offer benefits to one user or to all the participants of the deal. For example, a restaurant deal activated by a number of friends present at the location may offer a price reduction upon payment by a single user or it may offer price reduction to each participant making a separate payment.

A reference to a deal in this disclosure may refer to an instance of deal associated with a particular user or a type of a deal offered by a provider. The context of the disclosure clarifies whether a deal refers to an instance of a deal or deals of a particular type. For example, a deal may refer to an offer by a particular provider that gives 20% discount on a product if purchased before a given date. A deal may also refer to an instance of a social deal that is specific to a user and requires participation by connections of the user.

Deals System Environment

FIG. 1 is a diagram of a system environment for allowing users of a social networking system to interact with deals using the social networking system, in accordance with an embodiment of the invention. The users 135 interact with the social networking system 100 using client devices 105. The provider systems 120 (also referred to as "provider" herein) interact with the social networking system 100 to provide information describing the deals. Some embodiments of the systems 100, 120, and 130 have different and/or other modules than the ones described herein, and the functions can be distributed among the modules in a different manner than described here.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

A provider system 120 comprises a provider application programming interface (API) module 125 that allows the social networking system 100 to interact with the provider system. In an embodiment, the provider APIs 125 may be implemented as a web service. The provider APIs 125 allow the social networking system 100 to send requests for information to the provider system 120 and receive information associated with the deals from the provider system 120. For example, the social networking system 100 may send a request to the provider system 120 to determine whether a user of the social networking system 100 is an existing customer of the provider system 120.

In one embodiment, the client device 105 used by a user 135 for interacting with the social networking system 100 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc.

The client device 105 executes a user interface called dashboard 130 to allow the user 135 to interact with the social networking system 100. The dashboard 130 allows the user 135 to perform various actions related to deals. These actions include retrieving information describing deals that are likely to be of interest to the user, recommending deals to connections of the user, participating in a social deal, checking in to a location associated with a deal provider, and making a purchase using the deal. In an embodiment, the dashboard 130 is presented to the user via a browser application that allows a user to retrieve and present information from the internet or from a private network.

The social networking system 100 offers its users the ability to communicate and interact with other users of the social networking system 100. Users join the social networking system 100 and then add connections to a number of other users of the social networking system 100 to whom they desire to be connected. As used herein, the term "friend" refers to any other user to whom a user has formed a connection, association, or relationship via the social networking system 100. The term friend need not require that users to actually be friends in real life, (which would generally be the case when one of the members is a business or other entity); it simply implies a connection in the social networking system 100.

The social networking system 100 maintains different types of objects representing entities, for example, user profile objects 175, connection objects 195, deal objects 180, and provider objects 185. An object may be stored for each instance of the associated entity. A user profile object 175 stores information describing a user of the social networking system 100. A connection object 195 stores information describing relations between two users of the social networking system or in general any two entities represented in the social networking system 100. The deal objects 180 represent deals and the provider objects represent providers in the social networking system 100. These objects are further described in detail herein.

Figure 2:
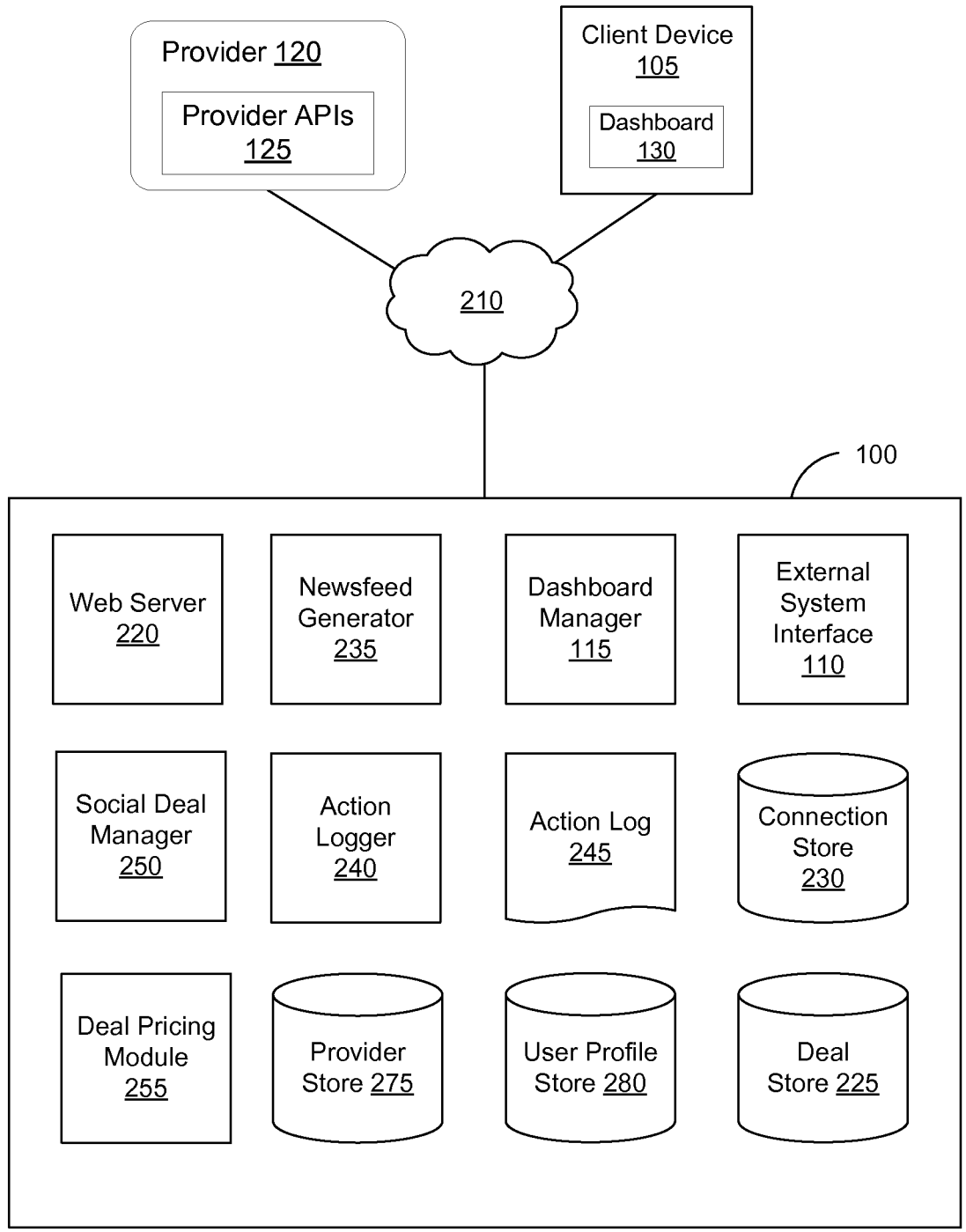
FIG. 2 is a diagram of the system architecture of a social networking system for allowing users of a social networking system to perform interactions with deals, in accordance with an embodiment of the invention.

The social networking system 100 comprises an external system interface 110, a dashboard manager 115 and various modules described in FIG. 2. The dashboard manager 115 allows users of the social networking system 100 to interact with the deals via the dashboard 130 user interface. The dashboard manager 115 presents information describing deals of interest to a user.

The dashboard manager 115 allows a user 135 to perform various actions associated with the deal. These actions include purchasing the deal, recommending the deal to a connection, commenting on the deal, following the deal, liking the deal, participating in a social deal, uploading an image associated with the deal, for example, uploading an image taken at a location associated with the deal for display as part of the user's profile. A user purchases a deal by completing a transaction that takes advantage of the deal. For example, if the deal offers a 20% discount on purchase of a product, the user purchases the deal by purchasing the product and redeeming the deal for the purchase.

The dashboard manager 115 receives requests from the user 135 for performing actions related to deals. A user 135 sends requests to the dashboard manager 115 via the dashboard 130. For example, a user 135a may send a request to recommend a deal to a connection of the user 135a (say, user 135b).

The external systems interface 110 of the social networking system 100 allows various modules of the social networking system 100 to interact with external systems including the provider systems 120. The external systems interface 110 also allows external systems to interact with the social networking system 100, for example, to access the social network information or to update information present in the social networking system 100.

The social networking system 100 comprises modules other than those shown in FIG. 1, for example, modules illustrated in FIG. 2 that are further described herein.

Social Networking System Architecture

FIG. 2 is a diagram of system architecture of a social networking system 100 for allowing users to interact with deals, in accordance with an embodiment of the invention. The social networking system 100 includes a web server 220, a newsfeed generator 235, a dashboard manager 115, an external system interface 110, an action logger 240, an action log 245, a social deal manager 250, a deal pricing module 255, a user profile store 280, a connection store 230, a deal store 225, and a provider store 275. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 allows users to communicate or otherwise interact with each other and access content, as described herein. The social networking system 100 stores user profile objects 175 in the user profile store 280. The information stored in user profile store 280 describes the users of the social networking system 100, including biographic, demographic, and other types of descriptive information, such as work experience, educational history, gender, sexual preferences, hobbies or preferences, location, and the like. The user profile store 280 may also store information provided by the user, for example, images, videos, comments, and status updates. Images of users may be tagged with the identification information of the appropriate users displayed in an image.

Any action that a particular user takes using the social networking system 100 is associated with the user's profile 175, through information maintained in a database or other data repository. Such actions may include, for example, adding a connection to the other user, sending a message to the other user, reading a message from the other user, viewing content associated with the other user, seeing what deals another user likes or is following, attending an event posted by another user, among others. In addition, a number of actions described below in connection with other objects are directed at particular users, so these actions are associated with those users as well.

The connection store 230 stores data describing the connections between different users of the social networking system 100, for example, as represented in a connection object 195. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking site based on common characteristics of the users (e.g., users who are alumni of the same educational institution). Connections in social networking system 100 are usually in both directions, but need not be, so the terms "connection" and "friend" depend on the frame of reference. For example, if Bob and Joe are both connected to each other in the social networking system 100, Bob and Joe, both users, are also each other's friends. The connection between users may be a direct connection; however, some embodiments of a social networking system 100 allow the connection to be indirect via one or more levels of connections. Connections may also be established between different types of entities for example, the social networking system 100 can have an object representing a school and users of the social networking system 100 that study in the school or who are alumni of the school can connect with the school in the social networking system 100.

The deal store 225 stores information describing deals, for example, deals represented as deal objects 180. The deal object 180 is associated with metadata describing the deal and comprises data specific to an instance of the deal. An instance of a deal may be created for each user that performs certain actions associated with the deal. For example, if the activation of a deal requires participation by connections of a user, the deal object 180 stores information describing the participants in the deal. As other connections of the user perform actions that contribute towards activation of the deal, the social networking system 100 updates the information stored in the deal object 180.

The information stored in a deal object 180 comprises a description of the deal, one or more deadlines associated with the deal, for example, a start date and end date during which the deal can be used, a location associated with the deal, a type of the deal, a redemption method for the deal, maximum redemption associated with the deal, a description of the benefit offered by the deal, for example, a percent reduction in price, any conditions or rules associated with the deal, a profile page associated with the deal on the social networking system 100, and other information. The deal object also stores information identifying the deal provider 120, a user associated with the deal, and connections of the user associated with the deal, for example, if the deal activation requires participation by connections of the user.

A deal object may be associated with different types of social information including users of the social networking system 100, events represented in the social networking system 100, actions performed by users that are associated with the deal, and the like. This information may be stored in various data stores in the social networking system 100. Associations between the deal objects 180 and the relevant social information associated with the deal may be either stored explicitly in the social networking system 100 or determined as needed. The deal object 180 may be associated with actions of users associated with the deal, for example, users that liked the deal or are following the deal, users who subscribed to the deal, users who purchased the deal, users who shared or gifted the deal, users who checked-in to locations associated with the deal, comments made by users on the deal etc.

A deal store 225 also stores a category associated with each deal that describes the type of product or services associated with the deal. Examples of categories of deals include "dining," "shopping," "professional services," "beauty and spas," "health and fitness," "automotive," "pet care," "financial services," "travel," and "arts and entertainment." In an embodiment, the social networking system 100 may have a list of business categories defined to classify various businesses. The social networking system 100 stores a mapping from the business categories to the deal categories to allow objects associated with business categories to be matched with deal categories. For example, business categories "restaurant" and "bar" map to the deal category "dining" Similarly, business categories "hotel," "airport," and "transit stop" map to deal category "travel."

The provider store 275 stores the provider objects 185 that store information describing the providers 120. The information describing a provider 120 includes categories associated with products/services offered by the provider, locations associated with the provider, and information needed for interacting with the provider APIs 125. The social networking system 100 stores associations between the provider objects 185 and the deals provided by the provider 120.

The web server 220 links the social networking system 100 via the network 210 to one or more client devices 105; the web server 220 serves web pages, as well as other web-related content, such as Flash, XML, and so forth. The web server 220 provides the functionality of receiving and routing messages between the social networking system 100 and the client devices 105 as well as other external systems, for example, the provider systems 120. These messages can be instant messages, queued messages (e.g., email), text and SMS (short message service) messages, or any other suitable messaging technique.

The action logger 240 is capable of receiving communications from the web server 220 about user actions on and/or off the social networking system 100. The action logger 240 populates the action log 245 with information about user actions to track them. Any action that a particular user takes with respect to another user is associated with each user's profile, through information maintained in a database or other data repository, such as the action log 245. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well.

The social deal manager 250 maintains information describing social deals and actions associated with social deals. The social deal manager 250 maintains metadata associated with the deal, including the type of actions required to activate the social deal, whether the actions have to be performed by the user or by the connections of the user, and the number of actions of each type required to activate the deal. Examples of types of actions that can activate a social deal include checking in to a location, making a purchase, sending a recommendation of the deal to a connection, registering with the provider, and the like. The social deal manager 250 monitors the actions performed by the connections of the user and the actions performed by the user to determine if an action associated with the social deal is performed. The social deal manager 250 manages the state of a social deal, for example, the number of actions of different types that have been performed so far towards activation of the deal and the number and types of actions remaining for activation of the deal.

The deal pricing module 255 determines the price of a deal for a given user. The deal pricing module 255 analyzes the historical actions of the user and the user's connections. The historical actions of the user and the user's connections can be obtained from the action log 245. The deal pricing module 255 identifies the actions of the user and he user's connection that are associated with the deal to determine the deal price. The deal pricing module 255 accesses the connection store 230 to determine the connections of the user and the user profile store 280 to access information describing the user and the connections of the user. The deal pricing module 255 considers social information associated with a user in determining the price of a deal for the user.

The social networking system 100 can use the external system interface 110 to send a request for information regarding a user to the provider system 120, for example, a request to enquire whether the user is a customer of the provider. Enterprises typically store customer information in databases of their enterprise systems and can provide access to the information to authenticated system via application programming interfaces (APIs). In an embodiment, the social networking system stores some of the information obtained from the provider's external system in a local cache for performance improvement.

In some embodiments, the system 100 is not a social networking system but a system that communicates with a social networking system to obtain the necessary social network information. The system 100 may communicate with the social networking system, for example, using APIs provided by the social networking system. In these embodiments, some modules shown in FIG. 2 may run in the system 100, whereas other modules may run in the remote social networking system.

The interactions between the client devices 105 and the social networking system 100 as well as the interactions between the provider 120 and the social networking system 100 are typically performed via a network 210, for example, via the internet. The network 250 enables communications between the client device 220 and the social networking system 210. In one embodiment, the network 210 uses standard communications technologies and/or protocols. In another embodiment, the entities can use custom and/or dedicated data communications technologies instead of, or in addition to, the ones described above. Depending upon the embodiment, the network 210 can also include links to other networks such as the Internet.

Deals Dashboard

Figure 3:
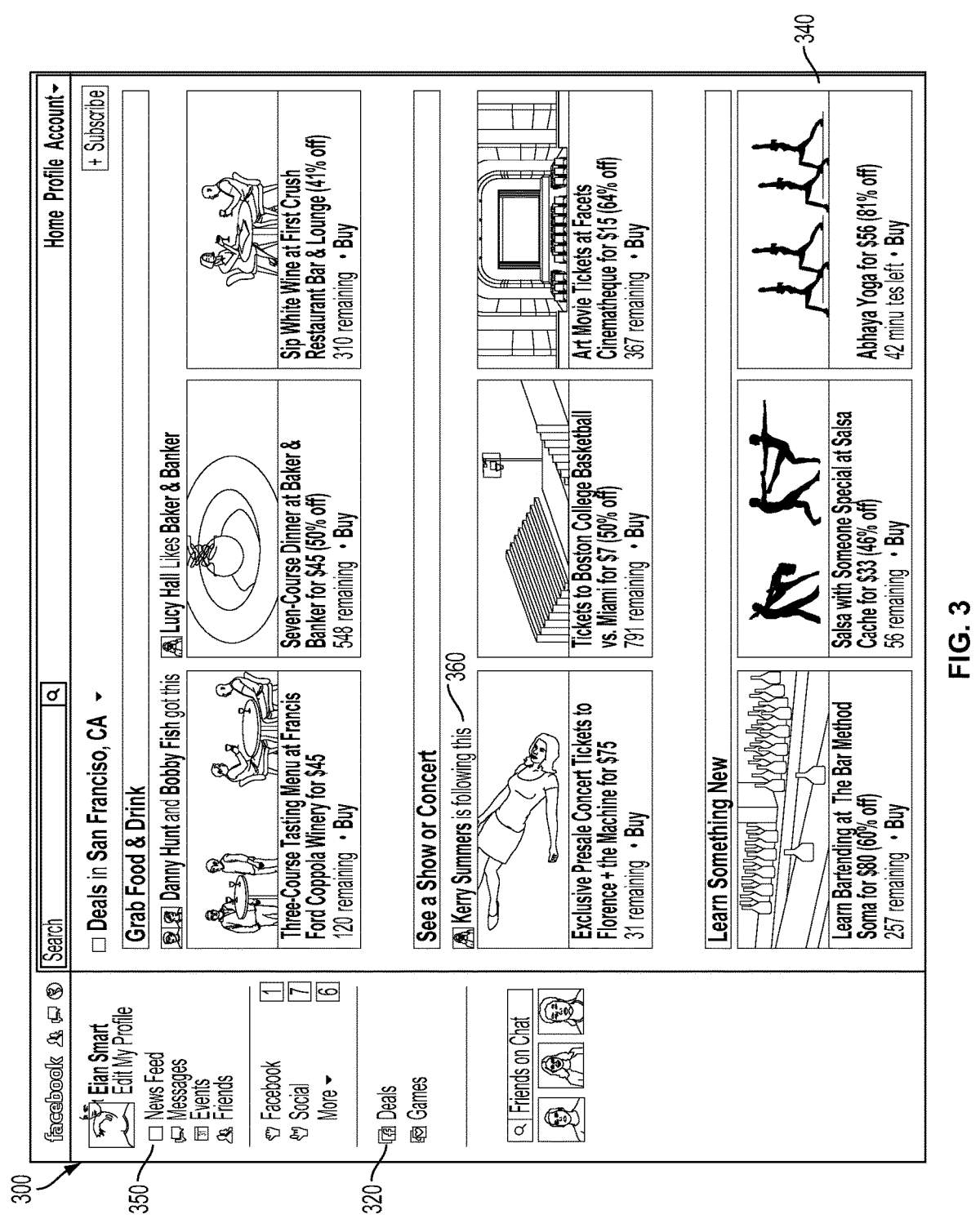

The dashboard 130 provides a user interface for allowing a user of a social networking system to view and interact with deals. FIG. 3 shows screenshots of the dashboard, in accordance with an embodiment of the invention. The dashboard 130 can be a part of a user interface that allows various types of user interactions with a social networking system 100. A user viewing the user's information 300 on a social networking system 100 (for example, from the user's home page) can request different type of information from the social networking system 100 by pressing buttons or links 350. The different types of information requested by the user include newsfeed stories of interest to the user, messages received by the user via the social networking system 100, connections of the user, events associated with the user, and the like. The user can also request information describing deals associated with the user clicking on button 320. The dashboard 130 user interface is presented to a user requesting deals information by clicking on the button 320.

Figure 4:
FIG. 4 is a user interface for presenting social information associated with deals of interest to the user of a social networking system, in accordance with one embodiment of the invention.

When a user requests deals information, the dashboard manager 115 receives deals relevant to the user as suggested by the suggestion module 265. The suggestion module 265 ranks various deals based on their relevance to a user to select deals for suggestion to the user. A user can select a particular deal 310 presented to the user and request more information describing the deal. FIG. 4 show screenshots of a user interface presenting social information associated with a particular deal selected by the user. FIG. 4 shows detailed information describing the deal, for example, the location 420 of the deal, the deal price 440, and images 450 describing the product/services associated with the deal. The user interface presented in FIG. 4 allows user actions 410 associated with the deal including purchasing the deal, recommending the deal to a connection, commenting on the deal, liking the deal, participating in a social deal, uploading an image associated with the deal and the like. The dashboard 130 may also present different types of social information associated with the deal, for example, connections 430 of the user that performed an action associated with the deal, events associated with the deal, social groups associated with the deal, images associated with the deal, comments 460 provided by users on the deal, and the like.

Figure 5:
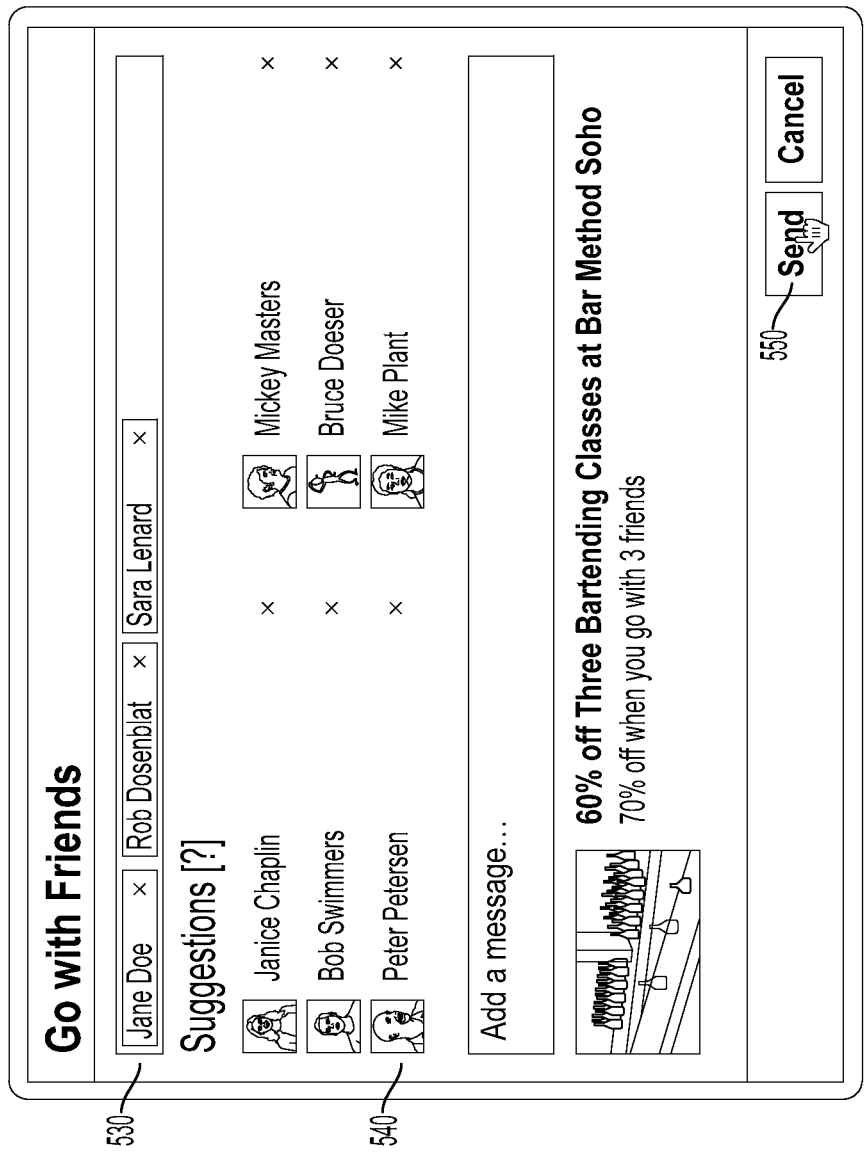
FIG. 5 shows a screenshot of a user interface displaying connections of a user of the social networking system that are likely to be interested in a deal, in accordance with one embodiment of the invention.

The social networking system 100 may request the user to perform certain actions associated with the deal. For example, the social networking system 100 may request the user to suggest the deal to the user's connections. FIG. 5 show screenshots of a user interface displaying connections of a user of the social networking system 100 that are likely to be interested in a deal, in accordance with one embodiment of the invention. The user interface in FIG. 5 allows a user to add 540 connections to a list for suggesting the deal. The user can delete 530 connections previously added to the list. Once the required connections are added to the list, the user can send 550 the information describing the deal to the connections.

The user interface presented in FIG. 5 can be used to allow a user to add/delete participants in a social deal. For example, the social networking system 100 can present a list of potential participants in a social deal to the user. The user can select the participants and send the information to the social networking system 100. If the user selects more than a threshold number of participants, the social networking system 100 can activate the social deal. Alternatively, the social networking system 100 can send a message to the selected participants to confirm their participation in the deal. The social networking system 100 can activate the deal if more than a threshold number of participants confirm that they intend to participate in the deal.

Distributing Deals Via the Social Networking System

A provider system 120 uses APIs provided by the external systems interface 110 to interact with the social networking system 100 for creating representations of deals in the social networking system 100. The APIs provided by the external systems interface 110 provide functionality for creating deals in the social networking system 100 including, creation of a profile page for presenting information describing the deal, specifying various attributes of the deal, accessing transaction level information associated with the deals, and specifying deal targeting criteria. The transaction level information associated with the deals includes purchases associated with the deal made by users of the social networking system 100 and participation of users of the social networking system 100 in a social deal.

The provider system 120 may synchronize deal information with the social networking system 100. In some embodiments, users may be able to take certain actions via the provider system 120 as well as via the social networking system 100. For example, for a given social deal, a user may be able to participate in the social deal via the provider system 120 or via the social networking system 100. As a result, information describing the state of the social deal may be stored at both the social networking system 100 and the provider system 120. If the social deal requires participation by more than a threshold number of connections of a user, the information associated with the deal is synchronized across the provider system 120 and the social networking system 100 to allow one of the systems to make a decision regarding activation of the deal. For example, if a user participates in the social deal via the social networking system 100, the social networking system 100 informs the provider system 120 updating the participant list of the deal stored in the provider system 120. Similarly, if a user participates in the social deal via the provider system 120, the provider system 120 updates the list of participants in the deal stored in the social networking system 100. Furthermore, the provider system 120 may have to send a request to the social networking system 100 to ensure that a participant in the deal is a connection of the user since that information may be stored only at the social networking system 100 and not at the provider system.

In an embodiment, deals available on a social networking system 100 are presented to a user via an external system, for example, a third party website. The external system can interact with the social networking system 100 via the external system interface 110. The social networking system 100 can provide instructions via the external system interface indicating the types of user interactions possible using the deal. For example, the user can use the external system to suggest the deal to the user's connections, invite connections to participate in the deal, create an event, purchase the deal with connections, comment on a deal, like the deal, follow the deal, share information describing the deal, retrieve actions performed by the user's connections associated with the deal (e.g., see which friends have bought the deal), chat with the users connections in the social networking system 100, view the dashboard to see other deals, etc. If a user performs certain actions (e.g., purchase the deal) via an external system, the information describing these actions is imported back into the social networking system 100. The information imported back into the social networking system 100 is treated by the social networking system 100 as if the action was performed by the user using the social networking system 100 (without involving the external system). Accordingly, the social networking system 100 may send notification messages informing connections of the user of the action. The social networking system 100 may use the information associated with the action to make subsequent decisions, for example, decisions to suggest deals to users, decisions to determine social information to be presented with deals etc. This allows providers to present deals using external systems (e.g., websites) and determine interactions between users and their deals. The provider can utilize the information provided by the social networking system 100 as well as store the associated actions in the social networking system 100 for future utilization.

In an embodiment, the social networking system 100 receives financial payment from the provider 120 if actions associated with the deal are performed by the users via the social networking system. These actions include purchasing the deal, user interactions with the social networking system to initiate the deal, interacting with the social networking system to determine participants in a social deal, and the like.

The financial payment received by the social networking system 100 may be a percentage of the financial transaction. In an embodiment, the users participating in the deal provide revenue to the social networking system 100 by making payments for the deal. The social networking system 100 provides a portion of the revenue received to the provider 120 and keeps a portion of the revenue. The portion of revenue received by the social networking system 100 for facilitating the transaction is called the platform share. The amount of the platform share may be determined based on a predetermined arrangement between the social networking system 100 and the deal provider. The social networking system 100 provides a portion of the platform share back to the users participating in the deal. In an embodiment, the portion of the platform share is provided back to the user by adjusting the deal price offered to the user. Accordingly, the users participating in the deal receive a better deal price by performing the transaction via the social networking system 100 compared to executing the transaction via the provider system 120.

In an embodiment, the size of the portion of the platform share given back to the user depends on the social information associated with the user. The social networking system 100 benefits from the transactions performed by the user in terms of growth of the social networking system 100. For example, the social networking system receives the platform share of the revenue. Furthermore, the social networking system gains loyalty of the users when users perform useful activities via the social networking system 100. Accordingly, the social networking system 100 rewards the users performing the transactions associated with the deal vial the social networking system 100 and the amount of reward depends on the benefits received by the social networking system 100.

Figure 6:
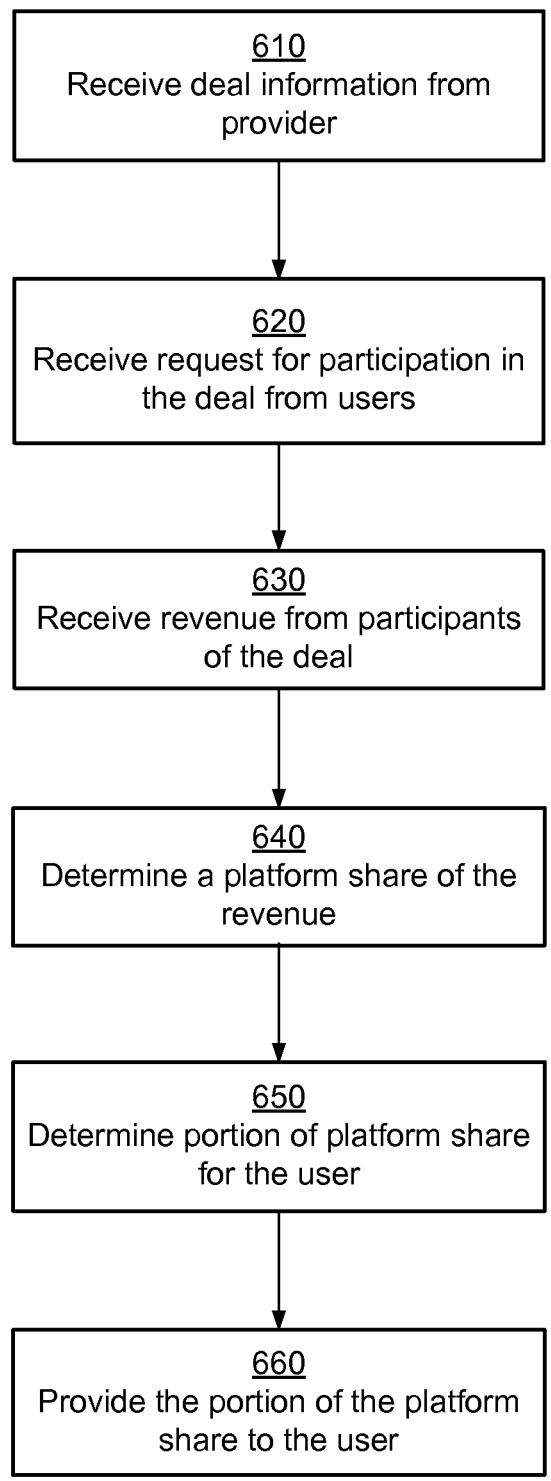
FIG. 6 is a flowchart of the process of determining a platform share associated with a deal that is provided to a user, in accordance with one embodiment of the invention.

FIG. 6 is a flowchart of the process of determining a platform share associated with a deal that is provided to a user, in accordance with one embodiment of the invention. The social networking system 100 receives 610 information describing a deal from a provider 120 via the external system interface 110. The deal information may include the price of the deal. The deal may be a social deal allowing participation by multiple users. The dashboard manager 115 receives 620 requests for participation from users of the social networking system. The participants may include users that are connected to each other in the social networking system. The dashboard manager 115 receives 630 revenue from participants of the deal. The deal price manager 255 determines 640 a platform share of the revenue based on the transaction. The platform share is the amount based on the transaction associated with the deal that is received by the social networking system for facilitating the transaction. The deal price manager 255 further determines 650 a portion of the platform share for the user and provides 660 the portion of the platform share of revenue back to the user.

Accordingly, the social networking system 100 returns a portion of the platform share to the user as a reward to the user for utilizing the social networking system for interacting with the deal. The portion of the platform share may be provided 660 to the user as an explicit payment to the user. The portion of the platform share may be provided 660 to the user in the form of a discounted price for the purchase associated with the deal. In other embodiments, the portion of the platform share is provided 660 as discounted price for one or more future deals.

FIG. 7 is an interaction diagram of a process illustrating how the social networking system 100 acts as a platform for distributing deals. The provider 120 sends 700 information describing social deals offered by the provider 120. The information describing the social deals is sent by the social networking system 100 to users likely to be interested in the social deal. A user 135*a* sends 705 a request to create an instance of a social deal for the user 135*a*. The social networking system 100 initiates 710 an instance of the social deal by creating the structures necessary for storing a deal object 180. The user may provide details of connections of the user 135*a* interested in participating in the social deal, for example user 135*b*. The social networking system 100 stores the information describing the potential participants of the social deal in the corresponding deal object 180.

The social networking system 100 sends 720*a*, 720*b* requests to all potential participants including users 135*a*, 135*b* to confirm whether they are actually interested in participating in the social deal. If more than a threshold number of participants confirm 730*a*, 730*b* participation in the deal, the social networking system 100 activates 740 the social deal. The social networking system 100 may verify that the participants of the social deal are connected via the social networking system 100. The connections between the participants may be direct or indirect. Subsequent to the deal being activated 740, the participants of the deal can purchase the deal. To purchase the deal, one or more participating users 135*a*, 135*b* send 750*a*, 750*b* payments to the social networking system 100. The payment by the users provides revenue to the social networking system 100.

The social networking system 100 determines a platform share of the revenue and a provider's share of the revenue. The platform share may be determined based on a predetermined arrangement, for example, a fixed percent of the transaction or a fixed value for each transaction. The social networking system 100 sends 770 the provider's share to the provider 120. The social networking system 100 sends a portion of the platform share to the users 135*a*, 135*b* participating in the social deal. The portion of the platform share may be sent only to the users that send 750 the payment.

As a result, the user gets rewarded by the portion of the platform share returned to the user. The portion of the platform share that the user receives may depend on the connections of the user. For example, the portion of the platform share that the user receives may depend on the connections of the user participating in the deal. The portion of the platform share that the user receives may depend on the number connections of the user that participate in the deal. The portion of the platform share may also depend on the total number of connections of the user in the social networking system. In this case, the social networking system 100 rewards the user for being an active member of the social networking system 100. In an embodiment, the portion of the platform share depends on the number of connections of the user with whom the user actively interacts. For example, a user that has the same number of connections as another user but who interacts more frequently with the connections compared to the other user is rewarded more than the other user. A user who has a large number of connections in the social networking system 100 has a greater potential to virally spread the information describing the social deal to other users of the social networking system 100. The portion of the platform share provided to the user may also depend on the number of connections of the user with whom the user has more than a threshold measure of affinity. For example, a user may have a large number of connections in the social networking system but may interact with very few friends. In this case, a measure of affinity of the user with the connections with whom the user interacts frequently may be high compared to connections with whom the user rarely interacts. Accordingly, the portion of the platform share is determined based on the number of friends with whom the user has more than a threshold number of interactions.

In an embodiment, the portion of the platform share of the user depends on the rate at which the user performs actions via the social networking system. A more active user of the social networking system gets a better deal compared to an inactive user of the social networking system. A user that is more active in the social networking system 100 has higher potential of disseminating information to other users of the social networking system. In this way, the social networking system 100 encourages users to make active use of the social networking system 100.

The portion of the platform share of the user may depend on the actions of the connections of the user. For example, if several connections of a user are very active in the social networking system, the user may get a larger portion of platform share compared to a user with fewer connections or with connections that are relatively inactive in the social networking system.

The actions performed by the user or by the connections of the user can include uploading information to the social networking system 100, for example, pictures, videos, documents, etc. The actions can include retrieving information from the social networking system 100, for example, viewing videos or images, viewing deals available via the social networking system, retrieving information about events, social groups etc. The actions can include interacting with other users of the social networking system, updating the user's status in the social networking system, recommending articles, friends, deals, products, etc. to other users and the like.

The portion of the platform share of the user may depend on the actions of the connections of the user that are determined to be potential participants of the deal. For example, even if a connection of the user does not participate in a deal, the user may have participated in similar deals in the past, thereby indicating that the connection is likely to purchase the deal in future. A connection may be determined to be a potential participant if the connection has attributes matching other users that have purchased similar deals in the past, for example, similar interests and demographic factors.

In an embodiment, a user may get a portion of the platform share even if the user does not participate in a deal, so long as connections of the user participate in the deal. In other embodiments, the user gets a platform share if the user participates in the deal along with the connections of the user. In another embodiment, the user gets platform share for participating in the deal, irrespective of the user's connections' participation in the deal.

A larger dissemination of useful information via the social networking system 100 promotes growth of the social networking system 100 since more users find value in using the social networking system 100. Larger growth of the social networking system 100 results in larger advertisement revenues for social networking system 100 since more providers are interested in advertising via the social networking system 100. Therefore, the social networking system 100 rewards users with higher potential to promote growth of the social networking system 100.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   storing by a social networking system, information describing connections between users;
   receiving information about a deal from a deal provider, wherein the deal is associated with a purchase price;
   offering, by the social networking system, the deal to a plurality of users of the social networking system;
   sending information describing criteria for activation of the deal for presentation via a first user interface to each of the plurality of users, wherein the criteria includes at least one condition based on an interaction of a user with the first user interface associated with the deal or a location of the user;
   activating the deal responsive to the criteria being satisfied for the deal, wherein the first user interface includes an indication that the deal is activated;
   receiving request for participation in the deal from one or more participating users;
   receiving information describing connections of participating users as potential participants of the deal;
   receiving revenue from the one or more participating users based on the purchase price associated with the deal;
   transferring a portion of the received revenue from the social networking system to the deal provider, thereby leaving a platform share from the received revenue;
   for each of the one or more participating users, determining a total number of connections of the user that also participated in the deal;
   for each of the one or more participating users, determining, by the social networking system, a total number of connections of the user in the social networking system having more than a threshold measure of affinity with the user, wherein the threshold measure of affinity is based on the user having a threshold number of interactions via the social networking system with a connection of the user;
   determining, by the social networking system, an amount of the platform share of the received revenue to provide to each of the one or more participating users, the amount of the platform share of the received revenue for each participating user determined based on the total number of connections of the participating user who also participated in the deal and the total number of connections of the participating user in the social networking system having more than a threshold measure of affinity with the user;
   for each of the one or more participating users, providing the determined amount of the platform share of the received revenue back to the user; and
   sending information describing an interaction of a participating user with the deal for presentation via a second user interface to one or more connections of the participating user.

2. The computer-implemented method of claim 1, wherein providing the amount of the platform share of the received revenue back to a participating user comprises discounting the purchase price for the participating user.

3. The computer-implemented method of claim 1, wherein the amount of the platform share of the revenue provided back to a participating user is determined based on the total number of connections of the participating user in the social networking system.

4. The computer-implemented method of claim 1, wherein the amount of the platform share of the revenue provided back to a participating user is determined based on actions of the connections of the participating user performed using the social networking system.

5. The computer-implemented method of claim 4, wherein an action comprises interactions with an object in the social networking system representing one of an image, a video, comment, or wall post.

6. The computer-implemented method of claim 4, wherein an action comprises uploading information describing an object in the social networking system.

7. The computer-implemented method of claim 4, wherein an action comprises retrieving information describing an object represented in the social networking system.

8. The computer-implemented method of claim 4, wherein an action comprises communicating with users of the social networking system.

9. The computer-implemented method of claim 4, wherein an action comprises providing a status update.

10. The computer-implemented method of claim 1, wherein the amount of the platform share of the revenue provided back to the participating user is further determined based on connections of the participating user identified as potential participants of the deal.

11. The computer-implemented method of claim 10, wherein a connection of the user is identified as potential participant of the deal based on matching information describing the connection with information describing the participating users.

12. The computer-implemented method of claim 1, wherein the amount of the platform share of the received revenue for each participating user is determined based on a rate of interaction of the user with the social networking system.

13. The computer-implemented method of claim 12, wherein the rate of interaction of the user with the social networking system is determined based on the rate at which the user retrieves information from the social networking system.

14. The computer-implemented method of claim 12, wherein the rate of interaction of the user with the social networking system is determined based on the rate at which the user provides content to the social networking system.

15. The computer-implemented method of claim 12, wherein the rate of interaction of the user with the social networking system is determined based on the rate at which the user interacts with other users of the social networking system.

16. The computer-implemented method of claim 1, wherein the amount of the platform share of the revenue provided back to a participating user is determined based on the total number of connections of the participating user in the social networking system with whom a rate of interaction of the user is more than a threshold.

17. The computer-implemented method of claim 1, wherein the amount of the platform share of the revenue provided back to a participating user is determined based on a rate at which connections of the participating user in the social networking system interact with the social networking system.

18. A computer-implemented system for compensating users for purchasing deals via a social networking system, the system comprising:
a computer processor; and
a computer-readable storage medium storing instructions that cause the computer processor to:
store by a social networking system, information describing connections between users;
receive information about a deal from a deal provider, wherein the deal is associated with a purchase price;
offer, by the social networking system, the deal to a plurality of users of the social networking system;
send information describing criteria for activation of the deal for presentation via a first user interface to each of the plurality of users, wherein the criteria includes at least one condition based on an interaction of a user with the first user interface associated with the deal or a location of the user;
activate the deal responsive to the criteria being satisfied for the deal, wherein the first user interface includes an indication that the deal is activated;
receive request for participation in the deal from one or more participating users;
receive information describing connections of participating users as potential participants of the deal;
receive revenue from the one or more participating users based on the purchase price associated with the deal;
transfer a portion of the received revenue from the social networking system to the deal provider, thereby leaving a platform share from the received revenue;
for each of the one or more participating users, determining a total number of connections of the user that also participated in the deal;
for each of the one or more participating users, determining, by the social networking system, a total number of connections of the user in the social networking system having more than a threshold measure of affinity with the user, wherein the threshold measure of affinity is based on the user having a threshold number of interactions via the social networking system with a connection of the user;
determine, by the social networking system, an amount of the platform share of the received revenue to provide to each of the one or more participating users, the amount of the platform share of the received revenue for each participating user determined based on a total number of connections of the participating user who also participated in the deal and the total number of connections of the participating user in the social networking system having more than a threshold measure of affinity with the user;
for each of the one or more participating users, provide the determined amount of the platform share of the received revenue back to the user; and
send information describing an interaction of a participating user with the deal for presentation via a second user interface to one or more connections of the participating user.

19. The computer-implemented system of claim 18, wherein the amount of the platform share of the received revenue provided back to the participating user is determined based on interactions of the connections of the participating user with objects associated with the deal.

20. A non-transitory computer-readable storage medium storing computer-executable code, the code comprising instructions that cause a processor to:
store by a social networking system, information describing connections between users;
receive information about a deal from a deal provider, wherein the deal is associated with a purchase price;

offer, by the social networking system, the deal to a plurality of users of the social networking system;

send information describing criteria for activation of the deal for presentation via a first user interface to each of the plurality of users, wherein the criteria includes at least one condition based on an interaction of a user with the first user interface associated with the deal or a location of the user;

activate the deal responsive to the criteria being satisfied for the deal, wherein the first user interface includes an indication that the deal is activated;

receive request for participation in the deal from one or more participating users;

receive information describing connections of participating users as potential participants of the deal;

receive revenue from the participating users based on the purchase price associated with the deal;

transfer a portion of the received revenue from the social networking system to the deal provider, thereby leaving a platform share from the received revenue;

for each of the one or more participating users, determine a total number of connections of the user that also participated in the deal;

for each of the one or more participating users, determine, by the social networking system, a total number of connections of the user in the social networking system having more than a threshold measure of affinity with the user, wherein the threshold measure of affinity is based on the user having a threshold number of interactions via the social networking system with a connection of the user;

determine, by the social networking system, an amount of the platform share of the received revenue to provide to each of the one or more participating users, the amount of the platform share of the received revenue for each participating user determined based on a total number of connections of the participating user who also participated in the deal and the total number of connections of the participating user in the social networking system having more than a threshold measure of affinity with the user;

for each of the one or more participating users, provide the determined amounts of the platform share of the received revenue back to the user; and send information describing an interaction of a participating user with the deal for presentation via a second user interface to one or more connections of the participating user.

21. The non-transitory computer-readable storage medium of claim 20, wherein the amount of the platform share of the revenue provided back to the participating user is determined based on interactions of the connections of the participating user with objects associated with the deal.

* * * * *